C. SONNEBORN.
METHOD OF MAKING RADIATORS.
APPLICATION FILED AUG. 8, 1918.
1,320,652.
Patented Nov. 4, 1919.
2 SHEETS—SHEET 1.
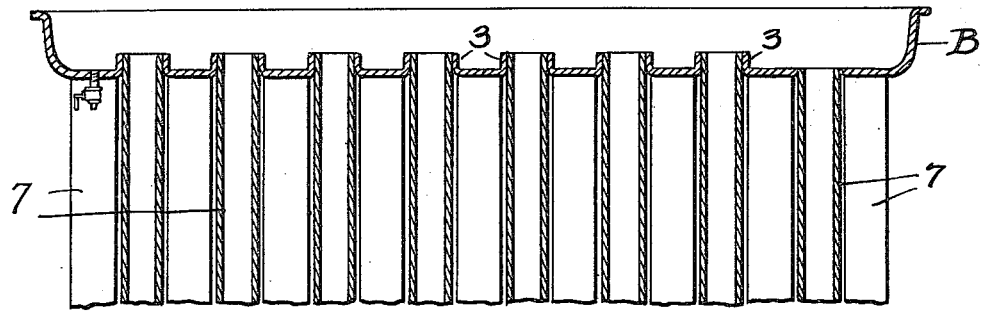
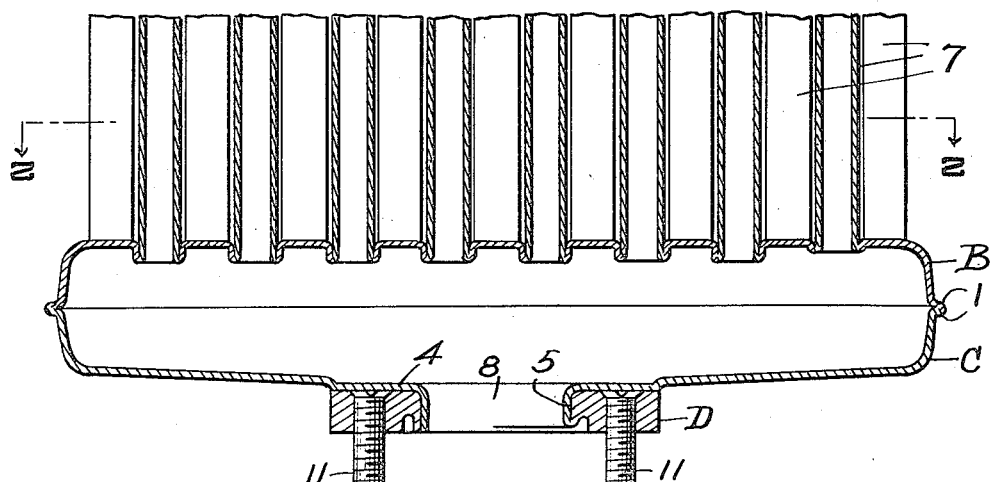
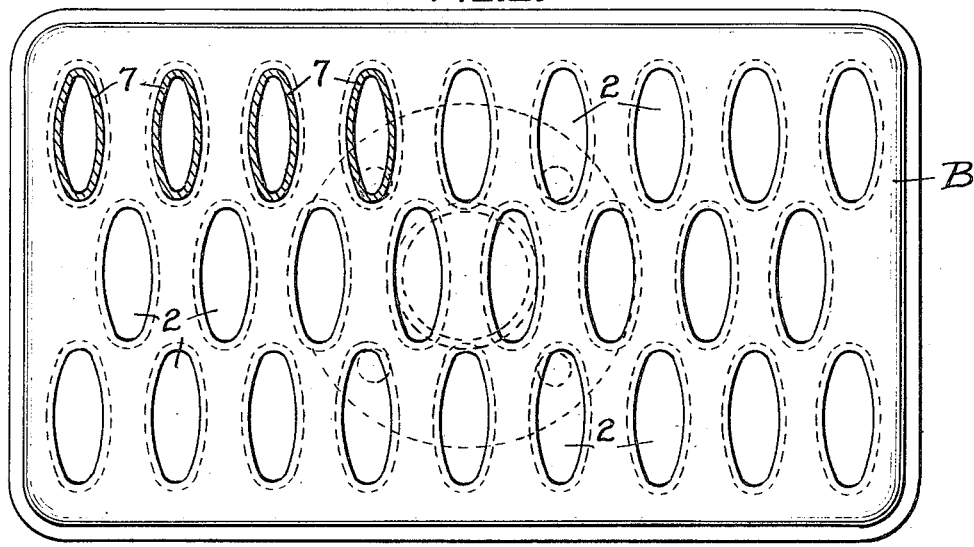
WITNESSES
J. Herbert Bradley.
Jo. Baily Brown
INVENTOR
Charles Sonneborn
by Fred'k W. Winter
his attorney C. SONNEBORN.
METHOD OF MAKING RADIATORS.
APPLICATION FILED AUG. 8, 1918.
1,320,652. Patented Nov. 4, 1919.
2 SHEETS—SHEET 2.
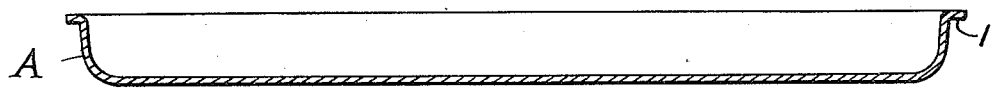
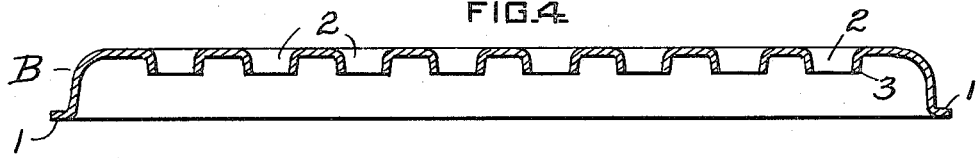
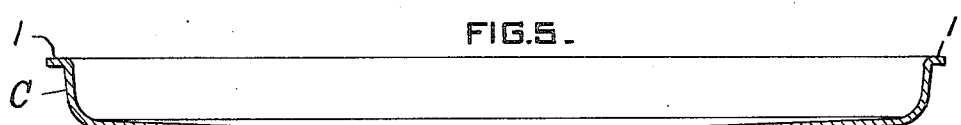
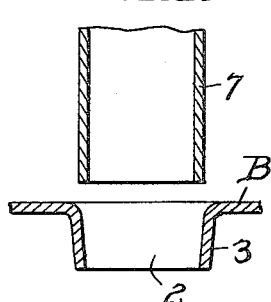
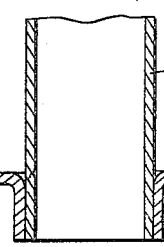
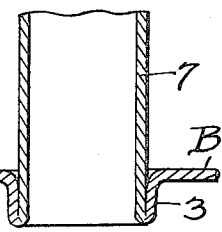
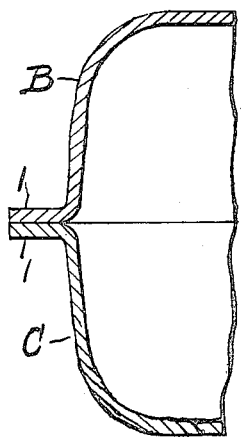
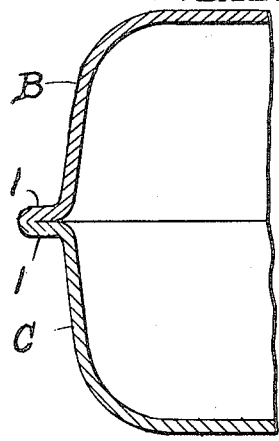
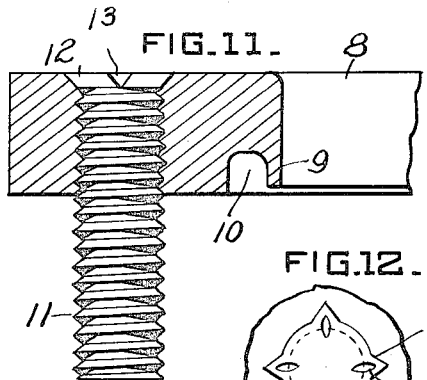
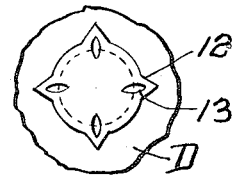

UNITED STATES PATENT OFFICE.

CHARLES SONNEBORN, OF WEST PITTSBURGH, PENNSYLVANIA, ASSIGNOR TO PRESSED METAL RADIATOR COMPANY, A CORPORATION OF PENNSYLVANIA.

METHOD OF MAKING RADIATORS.

1,320,652.   Specification of Letters Patent.   Patented Nov. 4, 1919.

Application filed August 8, 1918. Serial No. 248,916.

*To all whom it may concern:*

Be it known that I, CHARLES SONNEBORN, a resident of West Pittsburgh, in the county of Lawrence and State of Pennsylvania, have invented a new and useful Improvement in Methods of Making Radiators, of which the following is a specification.

This invention relates to radiators.

More particularly the invention has to do with radiators made of sheet metal in which the constituent parts are united by welding their meeting edges, and relates to the method of forming the constituent parts, and assembling and uniting them in order to produce an integral welded unitary article.

The objects of the invention comprise the forming of various parts of a radiator from sheet metal, welding tubes directly to the interior of header sections, welding the header sections to each other on their exteriors, and positioning and arranging the parts during the welding so as to secure convenience in assembling, and strength and rigidity in the finished article.

Referring to the drawings, Figure 1 is a central vertical section through a radiator made by the method herein set forth, partly assembled; Fig. 2 is a horizontal section on the line 2—2 of Fig. 1; Fig. 3 is a vertical section through a metal sheet formed into a header section; Fig. 4 is a section of the part shown in Fig. 3 as finally prepared for use as one-half of a header; Fig. 5 is a section showing the coöperating finished header section made from the blank of Fig. 3, and and adapted to be attached to the header section shown in Fig. 4; Figs. 6, 7, and 8 show the successive steps in the method of fastening a connecting tube into a header section; Figs. 9 and 10 show the successive steps of fastening the header sections together; Fig. 11 is a section through a connection plate adapted to be secured to the outside of a header; and Fig. 12 is a partial plan view of the parts shown in Fig. 11.

It is of distinct advantage in radiator construction to be able to make the parts of thin metal. This, because better radiation of heat is obtained through thin metal walls, and because the resulting article is lighter, and therefore easier to support, more economical to handle and ship, and easier to attach and detach to supply lines. By the method hereinafter set forth, I am enabled to build a radiator entirely composed of thin metal, in which all of the parts are rigidly connected to each other, making a strong unitary structure, and yet light and of very neat appearance. The method of assembling and attachment of the various parts renders them interchangeable in assembly, so that radiators of any desired size may be made by simply selecting connecting tubes of the required length, the headers being standardized. The finished radiator is adapted to be attached to any supply main and is self supporting thereon.

My method of construction and assembly is as follows: A flat sheet of metal is pressed into the shape of a rectangular pan, A, shown in section in Fig. 3. The edge of this pan is turned out parallel to the bottom to form a bounding edge or flange 1. The blanks A formed as shown in Fig. 3 are standard for both halves of the header made therefrom. A part of these blanks A are put in a press and the bottom punched inwardly, as shown in Fig. 4, to a form B, having perforations 2, bounded by internal flanges 3. The perforations 2 are oval, as shown in Fig. 2, and the flanges 3 taper slightly as indicated in Figs. 4 and 6. The perforations 2 may be arranged in any desired order but preferably they are in longitudinal rows, and staggered transverse order, as indicated in Fig. 2. Other blanks A are pressed to the form C shown in Fig. 5. The bottom of the header section C is sloped from the sides toward its middle point, which is surrounded by a depressed portion 4, having a circular outwardly extending flange 5, which bounds a circular opening 6 punched outwardly in the bottom of this header section. Each of these header sections shown in Figs. 4 and 5 retains the flange 1 about its edges, and when the two sections are placed edge to edge, as shown in Fig. 9, these flanges are positioned relative to each other, as shown in that figure.

The perforations 2 of the header section B are adapted to receive the ends of oval tubular connecting members 7. Fig. 6 is an enlarged sectional view of an end of one of the tubes 7, in position to be inserted in one of the perforations 2, from the outside of the header section. It will be observed that the tube is slightly smaller than the opening bounded by the flange 3, at the point of insertion, but that the flange tapers and at its edge is smaller than the end of the tube.

This construction permits the end of tube 7 to be readily positioned and started into the perforation bounded by the flange 3, but requires considerable pressure in order to force it even with the edge of the flange, as shown in Fig. 7. Consequently, after the tube has been forced into the position shown in Fig. 7, it is held rigidly by resilient engagement and compression of the flange 3 upon the end of the tube.

In Fig. 11 is shown a partial vertical section through a connecting member D adapted to be attached to the outside of header section C. This member is in effect a heavy metal ring, having a central circular opening 8, adapted to fit snugly over the flange 5 of header section C. This central opening is bounded by an outer flange 9, surrounding which is an annular groove 10. When the member D is in position on the header section C, the flanges 5 and 9 are even with each other, as shown at the left, in Fig. 1.

Threaded bolts 11 extend through holes bored in the member D, and have their heads seated on the inner face of said member, between it and the bottom of the header section C, as shown in Fig. 1. The head of this threaded member is formed with radial extensions 12, seated in notches 13, in the inner face of the member D, to prevent rotation of the threaded member with respect to the member D.

The method of constructing and assembling the radiator is as follows:

Sheet metal plates of proper size are first pressed into pan shapes A with bounding flanges, as shown in Fig. 3. Part of these blanks A are then punched with a series of perforations having tapered flanges extending inwardly, as shown in Fig. 4, constituting header sections B. Other blanks A are then pressed to form sections C, having sloping bottoms, and central openings and bounding flanges, as shown in Fig. 5.

Two of the sections B are then placed at proper distance from each other, with their outer sides opposed, and a set of tubes corresponding in number to the perforations in the header section, are placed in position and forced into the said perforations in the header section until the ends of the tubes are flush with the edges of the flanges, as shown in Fig. 7. When this has been done, the two header sections, and the connecting tubes form a rigid unit which may be handled easily, and in which the tubes are held rigidly at exactly the right position in the header section. This structure is illustrated in the upper part of Fig. 1, wherein the section is shown attached to the tubes merely by the resilient engagement resulting from forcing the latter members into the perforations of the former.

Then the adjoining edges of the tubes and bounding flanges are welded together on the inside of the header section, by application of an oxy-acetylene torch, resulting in the union shown in Fig. 8, and at the bottom of Fig. 1. After both header sections have been thus attached to each of the tubes, coöperating header sections C are placed in contact with the sections B, with their bounding flanges 1 coinciding as shown in Fig. 9, and these edges are likewise welded by the oxy-acetylene torch, resulting in the union shown in Fig 10. Consequently, the welds of the tubes to the headers are made first and eventually inclosed inside the header. The tube welds are supported and strengthened by engagement of the end of the tubes with the inwardly extending flanges 3, as above described.

Either before or after the sections B and C are joined, connecting plates D are attached to the headers C. The threaded bolts 11 are placed in position first, then plate D is slipped over the flange 5, and the adjacent edges of flanges 5 and 9, as shown at the left of Fig. 1, are welded by the oxy-acetylene torch, resulting in a union as shown at the right of Fig. 1.

Obviously any pipe or other union may be connected to the radiator by means of a flange secured to the bolts 11, as will be obvious. Perferably these bolts are four in number, and set 90° apart with respect to the opening 8 so that the radiator may have four positions with respect to its connecting pipe.

Obviously also, the upper header of the radiator as shown in Fig. 1, may be completed by either a section C,—thus providing for a circulation through the radiator from end to end thereof,—or an unperforated header section A may be used to complete the structure, resulting in a radiator having a single inlet at the bottom thereof. Obviously also, the tubes 7 may be of any desired length, resulting in radiators of different sizes, but using the same standard headers. That is, in order to secure any desired amount of radiation, within the range of such structure, it is only necessary to provide connecting tubes 7 of a desired length.

The sloping of the lower section of the bottom header to its outlet opening secures a complete drainage of that member. In order to secure the same result with respect to the upper header, a drainage valve may be provided in the bottom thereof, as shown at the left of Fig. 1, or one of the tubes and its retaining flange may be melted down in the welding process, flush with the bottom of the header, as shown at the right of Fig. 1.

It will be obvious that the method of assembling and uniting the parts of this radiator permits the use of sheet metal plates as the manufacturing base. Even the tubes may be made from this, by the well known acetylene process of welding tubes. The resulting structure is strong, light, reinforced on the inside, self draining, and when completed is in effect a single piece of metal, since the autogeneous welding of all seams makes the union fully as strong as the plate metal itself at other points.

I claim:

1. The method of making radiators comprising two-part headers and connecting tubes, consisting in forcing the ends of the tubes through perforations in the headers, and welding the said ends to the inside of the headers.

2. The method of assembling sheet metal radiators comprising the forming of headers in two sections, welding connecting tubes to the interior of one of the sections, then completing the header by welding the remaining section thereof to the tube retaining section.

3. The method of making radiators comprising headers and connecting tubes comprising the forming of sheet metal into pairs of supplementary header sections, perforating one of the sections, forcing the ends of header-connecting tubes through the perforations and welding their ends to the inside of the header section, then completing the header by welding the supplementary sections thereof to each other.

4. The method of making radiators comprising the forming of header sections having flanges extending around their meeting edges, perforating one set of the sections and forming bounding flanges for said perforations, forcing connecting tubes into the flanged perforations, welding the ends of the tubes to the bounding flanges inside the headers, then completing the header by welding its exterior flange to a similar flange on a supplementary header section.

5. The method of assembling sheet metal radiators consisting of sectional headers connected by tubular members, comprising forcing the tubular members under pressure into perforations through the inner header sections, welding the tube ends to the inside of said header sections, and completing the headers by welding to the first header sections supplementary outer header sections.

6. The method of making radiators comprising sectional headers and tubes uniting the same, consisting in forming the tubes and headers separately with the adjoining parts shaped to have thin parallel meeting edges, and uniting said parts into an integral structure by welding said meeting edges.

7. The method of making radiators comprising pressing sheet metal blanks to form similar header sections having parallel meeting edges, perforating the header sections so as to form inturned tapered flanges around the perforations, joining said perforated sections by forcing the ends of connecting tubes into the tapered flanges from the outside of the two header sections and welding the ends of the tubes to the said flanges inside the header sections, forming suitable supply openings in other header sections and then uniting the latter sections to the tube retaining sections by welding the meeting edges of the adjacent sections.

In testimony whereof I have hereunto set my hand.

CHARLES SONNEBORN.

Witnesses:
J. R. BRODBECK,
NATHAN J. LOVE.